United States Patent [19]

Welch et al.

[11] 4,169,436
[45] Oct. 2, 1979

[54] RECIPROCATING MACHINE WITH REFRIGERATED COOLING OF INTAKE AIR

[75] Inventors: Lewis W. Welch, Los Angeles; Glenn E. Fish, Whittier, both of Calif.

[73] Assignee: Welch Diesel Engine, Inc., Los Angeles, Calif.

[21] Appl. No.: 850,572

[22] Filed: Nov. 11, 1977

Related U.S. Application Data

[63] Continuation of Ser. No. 625,434, Oct. 20, 1975, abandoned.

[51] Int. Cl.² ............................................. F02B 29/04
[52] U.S. Cl. ........................ 123/58 BC; 123/119 CD; 60/599
[58] Field of Search ..... 123/58 BC, 58 AM, 119 CD; 60/598, 599

[56] References Cited

U.S. PATENT DOCUMENTS

| | | | |
|---|---|---|---|
| 3,007,462 | 11/1961 | Balzer | 123/58 BC |
| 3,029,594 | 4/1962 | Miller | 123/119 CD X |
| 3,071,934 | 1/1963 | Toyner | 123/119 CD X |
| 3,141,293 | 7/1964 | Crooks | 123/119 CD X |
| 3,212,483 | 10/1965 | Balzer | 123/58 BC |

*Primary Examiner*—Ira S. Lazarus
*Attorney, Agent, or Firm*—Jessup & Beecher

[57] ABSTRACT

A barrel-type reciprocating machine having a block with a shaft journaled through its center with the ends of the shaft offset at an oblique angle. A pair of wobble spiders are attached to the oblique crank end of the shaft and are in turn attached to an output shaft. A plurality of cylinders are angularly spaced around the shaft parallel to the axis of rotation of the shaft. Each cylinder has a pair of opposing pistons and a plurality of intake and exhaust ports which are open and closed by the opposing pistons. Semi-circular concentric intake and exhaust manifolds surround the cylinders and communicate with the ports leading to the cylinders. The intake manifold has a plurality of coolant tubes passing through the wall of the intake manifold and into the cavity for cooling the intake air passing through the manifold into the cylinder. The coolant tubes traverse a circuitous path through the manifold and pass back out through the wall of the intake manifold to hose fittings. A suitable refrigerant is circulated through the coolant tubes when the engine is operating to cool the intake air entering the cylinders, the cylinder itself, and the intake piston, thus substantially increasing the thermal efficiency of the engine.

3 Claims, 3 Drawing Figures

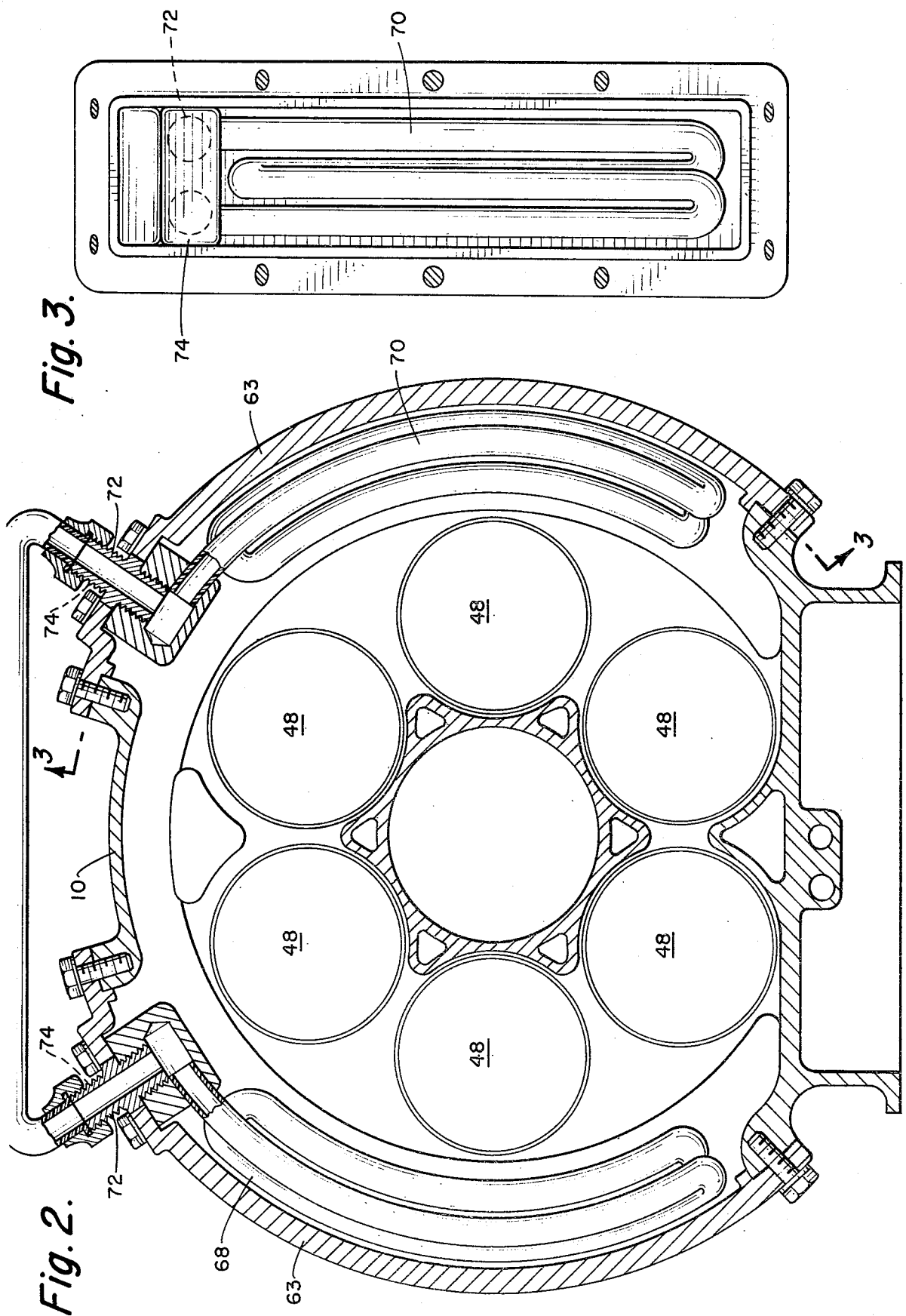

RECIPROCATING MACHINE WITH REFRIGERATED COOLING OF INTAKE AIR

This application is a continuation of pending application Ser. No. 625,434, filed Oct. 20, 1975, now abandoned.

BACKGROUND OF THE INVENTION

This invention relates generally to barrel-type reciprocating machines and engines and more particularly relates to a system for cooling the intake air and cylinder to increase power and thermal efficiency.

In the past, numerous methods and apparatus have been proposed to increase power and efficiency of reciprocating machines without increasing their overall size. One of the methods proposed for increasing power and efficiency was to provide increased cooling of the engine during operation. It was proposed that the entire engine and its cylinders be surrounded with cooling coils through which a refrigerant was passed while the engine was operating. While this proposal has some merit, it was not entirely satisfactory because the coolant coils were completely external and had to attempt to cool massive amounts of hot metal. Therefore, tremendous amounts of refrigerant had to be pumped through the cooling coils in order to have a significant effect on the engine operation. Various other methods of increasing engine cooling have been attempted but have met with limited success.

The present invention provides an apparatus for tremendously increasing engine power and cooling while overcoming some of the difficulties noted above. The present invention is an improvement on the reciprocating machine disclosed in U.S. Pat. No. 3,212,483, issued Oct. 19, 1965. The engine disclosed in this patent is a barrel-type having semi-circular intake manifolds surrounding cylinders having intake ports which are valved by opposing pistons in the angularly spaced cylinders. It was discovered that by cooling the air flowing through the manifold into the cylinders a considerable improvement in power and thermal efficiency can be obtained. The coolant tubes installed directly in the manifold cool the intake air increasing the density to provide more oxygen, cools the cylinder sleeve and intake piston controlling cylinder temperature and giving a controlled pre-combustion cavity and finally helps cool the water in the water jacket, reducing overall engine temperature. The cylinder and piston cooling also reduces emission problems because the high combustion temperatures which produce NOX (nitrous oxide) are not present.

It is an object of the present invention to provide auxiliary engine cooling which will increase thermal efficiency.

It is another object of this invention to provide an apparatus for directly cooling intake air as it is passed into the cylinder for combustion.

Another object of this invention is to provide a reciprocating machine with coolant tubes installed directly in the intake manifold to cool the intake air and the cylinders.

Yet another object of the present invention is to cool the cylinder to control the cylinder temperature.

Still another object of the present invention is to cool the intake piston to control the temperature of the pre-combustion cavity.

Another object of the present invention is to assist overall engine cooling.

Another object of the present invention is to provide cooling for intake air, combustion chamber and main cooling system without the need for a massive refrigeration system.

Other objects, advantages and novel features will become apparent from the following detailed description of the invention when considered in conjunction with the accompanying drawings wherein like reference numbers identify like parts throughout the drawings.

BRIEF DESCRIPTION OF THE DRAWINGS

FIG. 2 is a sectional view taken at 2—2 of FIG. 1 showing the installation of the coolant tubes.

FIG. 3 is a sectional view taken at 3—3 of FIG. 2 showing the inside of the manifold cover with coolant tubes.

DETAILED DESCRIPTION OF THE PREFERRED EMBODIMENT

Figure 1:
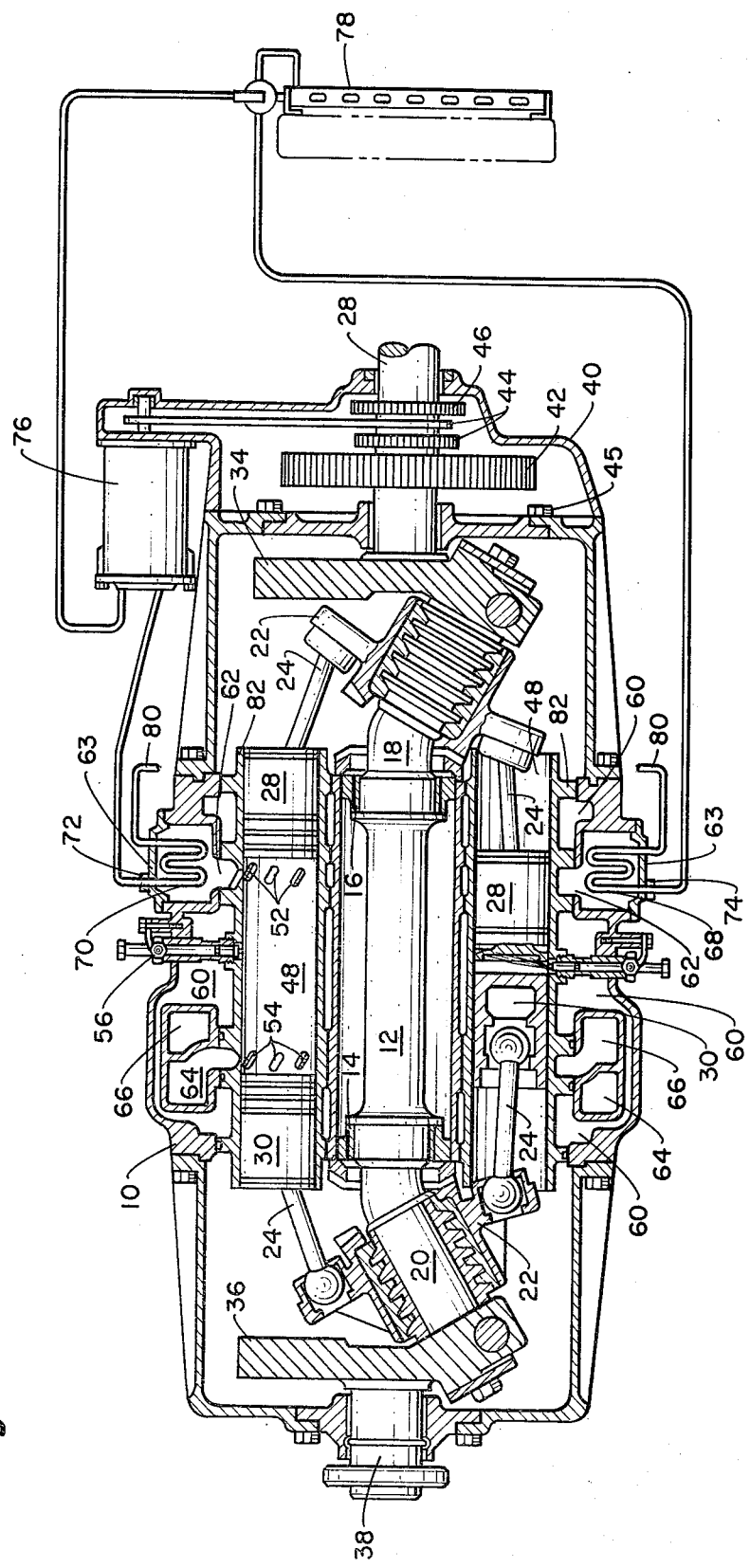
FIG. 1 is a sectional side elevation in semi-schematic form of the improved version of the reciprocating machine having coolant tubes installed in the intake manifold.

Referring now to FIG. 1, the reciprocating machine is shown as including an engine block designated generally by the number 10 having a central shaft 12 extending through the block. The shaft 12 is journaled in the block by means of a pair of bearings 14 and 16 at each end of the block.

On each end of the shaft there is a pair of oblique cranks 18 and 20 formed integral with the shaft which extend from the opposite ends. Mounted on the oblique cranks 18 and 20 of the shaft 12 are wobble spiders 22 which are connected via rods 24 to pistons 28 and 30. The ends of oblique cranks are connected to counterweights 34 and 36 with counterweight 36 linking the crank 20 to a drive shaft 38. The drive shaft 38 is preferably integral with the counterweight 36 and is aligned with the shaft 12.

A housing or end bell 40 is mounted on the end of the block 10 by means of screws 45. Appropriate sprockets 42 and 44 and gear 46 of different diameters, for example, are mounted on the drive shaft 28. These sprockets and gear are used to drive certain auxiliary equipment, such as the intake and scavenger blower, the lubricating pump, and for circulating coolant as will be described hereinafter. The main load, such as a drive shaft, would be coupled to the shaft 38.

The engine block 10 has a plurality of cylinders 48 extending through and parallel to the axis of shaft 12. The cylinders 48 are spaced equal radial distances from the shaft 12 and are spaced at equi-angular positions around the shaft 12.

The left-hand end of the engine block 10 is referred to as the "exhaust" end and the right-hand end is denominated the "intake" end. A plurality of exhaust pistons 30 are respectively mounted on exhaust end of the cylinders 48 for reciprocal motion therein. A corresponding plurality of intake pistons 28 are respectively mounted in the intake ends of the cylinders 48 for reciprocal motion therein. These pistons are called intake and exhaust pistons because they serve as valves to open and close intake ports 52 and exhaust ports 54 respectively. The ports 52 and 54 are each inclined at an angle to the axis of the cylinder to provide for angular passage of the piston rings over the ports for smooth operation. The intake ports 52 are inclined to the corresponding radial axis by angles of, for example, 30 to 35 degrees to provide a desired swirling action for the air entering the cylinder during the intake and scavenger periods. The exhaust ports 54, on the other hand, are inclined to the corresponding radial axes in the manner to direct exhaust gases along essentially straight paths to the exhaust manifolds. The exhaust and intake pistons 30 and 28 approach each other within each cylinder 48 and they are then pushed apart by the rapid burning and expansion of the fuel injected into the cylinders by the injectors, such as injector 56 from an appropriate fuel line 58. As noted, a fuel injector, such as the injector 56, is provided for each cylinder. The engine shown in FIG. 1 is of the opposed piston type and operates basically in a known manner as described in U.S. Pat. No. 3,212,483, referred to above.

The engine block 10 is shaped to provide passageways 60 for coolants such as water and also to provide an intake manifold 62 which is semi-circular in shape and surrounds the intake ports 52 in the different cylinders. The block 10 is also shaped to provide dual exhaust manifolds 64 and 66. It will be understood that the shape of the block as mentioned in the preceding paragraph cooperates with the complementing shape of the various cylinder liners or sleeves 82 so as to provide the desired passageway and manifolds. Therefore, the combustion chamber of the engine in each cylinder is bounded on one side by the flat head of an exhaust piston 30 so as to provide the most efficient exhaust from the exhaust ports 54, and is bounded on the other side by the pocketed head of an intake piston 28, which receives the injection spray from the fuel injector 56 and prevents the spray from being wahsed out to the cylinder bore. The bore of each of the cylinder liners 82 is eccentrically positioned with respect to the bore of the corresponding cylinder. Appropriate grooves are formed in the outer surface of the liners which cooperate with mating grooves in the engine block 10 to form the spaces 60 for the coolant, as well as spaces for the intake manifold 62 and exhaust manifolds 64 and 66.

In operation, fuel is injected through injectors 56 and air is circulated through intake manifold 62 and intake ports 52 into the cylinder 48. In order to increase thermal efficiency, it was found much more advantageous to directly cool the intake air than attempt to externally cool the massive amounts of metal in the engine in order to effect this cooling efficiency. Therefore, the coolant tubes 68 (illustrated schematically in FIG. 1) and 70 are provided in the intake manifold 62 as is shown more clearly in FIG. 2. The coolant tubes 68 and 70 form a circuitous path in the manifold and are attached by means of inlet and outlet nipples 72, 74 to the manifold covers 63. A refrigerant or coolant material is pumped through the coolant tubes 68, 70 by means of coolant compressor 76 after being cooled in the usual manner in a heat exchanger or condenser 78. The coolant tubes are kept away from the walls of the intake manifold by means of suitable insulating spacers, if necessary, to maximize coolant area. Coolant is pumped into one end of the coolant tubes through nipple 72, passes through the circuitous path of the coolant tubes, and is returned to the heat exchanger and compressor through nipple 74.

The coolant tubes also cool the cylinder liners 82 and intake piston 28 to control cylinder temperature and control the pre-combustion cavity to eliminate hot spots. Overall engine cooling is also improved by the close proximity of coolant tubes 68, 70 to the water jacket 60.

The coolant may be separately pumped through each set of coolant tubes or may be pumped through one set of coolant tubes and through cross-connecting tube 80 into the other coolant tubes through the second manifold and out nipple 74, back to the heat exchanger 78 and compressor 76. However, a disadvantage of this configuration is that the coolant may be somewhat heated by passing through the first manifold and may not achieve the maximum amount of cooling preferred. In this case inlet and outlet nipples 72 and 74 on either side of the engine could be cross-connected by a single tube having a single nipple for connection to the heat exchanger 78 and compressor 76.

With the cooling tubes or coils 68, 70 mounted inside or internal of the intake manifold, they not only cool the air, but reduce the temperature tremendously in the sleeve or cylinder liners 82 forming chamber 48 and in the water jacket 60 for engine cooling. This keeps the temperature down inside the combustion chamber while still permitting compression and combustion, eliminating the high temperatures which cause the generation of nitrous oxide (NOX) which is presently of great concern in the present emission standards. The internal cooling coils have an additional benefit of cooling the intake piston 28 to prevent hot spots which also keeps the temperature down inside the combustion chamber. With the cooling or refrigeration mounted internally in the intake manifold, thermal efficiencies of three times more than the ordinary gasoline engine are possible. Thus, the system disclosed has three distinct advantages in that it not only cools the intake air, reducing the temperature of the air so that we get a denser concentration, allowing us to get more oxygen into the cylinder, but also cools the combustion chamber by cooling the chamber sleeve and intake piston and cools the water jacket 60 improving overall engine cooling.

This method and apparatus for cooling the intake air of the reciprocating engine by refrigeration can be accomplished and is significantly enhanced because of the unique design of the barrel-type engine described in the patent referred to above. The air intake manifold being an integral part of the engine permitted adaptation of the novel concept of direct cooling of air in the intake manifold by cooling tubes directly installed in the manifold, thus causing the cylinders to operate at a lower temperature as well as providing more oxygen through denser air, which means increased power and lower exhaust pollutants. An additional benefit of this system is the addition of moisture to the intake air from use of the coolant tubes in the intake manifold. This invention provides, therefore, an improved reciprocating engine of the barrel type, which, when constructed in the improved manner suggested, provides optimum thermal efficiency during operation.

Obviously, many modifications and variations of the present invention are possible in light of the above teachings. It is therefore to be understood that the full scope of the invention is not limited to the details disclosed herein and may be practiced otherwise than as specifically described.

What is claimed is:

1. A barrel-type reciprocating machine comprising:
   a block;
   a shaft journaled in said block including an oblique crank on each end thereof;

a wobble spider mounted on each oblique crank;
a plurality of cylinders in said block angularly spaced parallel to the axis of rotation of said shaft;
a plurality of pistons reciprocally mounted in corresponding ones of said cylinders;
a plurality of connecting rods linking said pistons to said wobble spiders;
a plurality of intake ports in said cylinders;
one or more semi-circular intake manifolds formed integrally with said block surrounding said cylinders and communicating with said intake ports;
a plurality of coolant tubes formed in circuitous path and conforming to the semi-circular shape of said intake manifold, whereby the coolant coils are in close circumadjacent proximity to said intake ports; and
means for circulating a coolant through said tubes, whereby air flowing through said manifold into said ports is cooled by said tubes.

2. The machine according to claim 1 wherein said coolant tubes are spaced from the walls of said intake manifold whereby the intake air may circulate around said tubes.

3. The machine according to claim 1 wherein the means for circulating coolant through said tubes is a compressor coupled to said shaft.

* * * * *